(12) United States Patent
Malinovskiy et al.

(10) Patent No.: US 8,159,386 B2
(45) Date of Patent: Apr. 17, 2012

(54) METHOD FOR ASCERTAINING AND MONITORING FILL LEVEL OF A MEDIUM IN A CONTAINER BY A TRAVEL TIME MEASURING METHOD

(75) Inventors: Alexey Malinovskiy, Lorrach (DE); Dietmar Spanke, Steinen (DE); Edgar Schmitt, Friesenheim (DE); Steffen Markoni, Rheinfelden (DE); Simon Greth, Lorrach (DE); Klaus Pankratz, Kandern (DE); Stefan Gorenflo, Hausen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 12/654,696

(22) Filed: Dec. 29, 2009

(65) Prior Publication Data

US 2010/0182190 A1 Jul. 22, 2010

(30) Foreign Application Priority Data

Dec. 30, 2008 (DE) .......................... 10 2008 055 188
Feb. 19, 2009 (DE) .......................... 10 2009 001 010

(51) Int. Cl.
*G01S 13/08* (2006.01)
(52) U.S. Cl. ........................................ 342/124; 342/118
(58) Field of Classification Search .................. 342/118, 342/124
See application file for complete search history.

(56) References Cited

U.S. PATENT DOCUMENTS

| | | | | |
|---|---|---|---|---|
| 5,614,911 A * | 3/1997 | Otto et al. ..................... | 342/124 |
| 5,689,265 A * | 11/1997 | Otto et al. ..................... | 342/124 |
| 5,734,346 A * | 3/1998 | Richardson et al. .......... | 342/124 |
| 6,107,957 A * | 8/2000 | Cramer et al. ................ | 342/124 |
| 6,684,919 B2 * | 2/2004 | Gaiser ............................ | 141/95 |
| 6,734,819 B2 * | 5/2004 | Spanke ......................... | 342/124 |
| 6,867,729 B2 * | 3/2005 | Berry et al. ................... | 342/124 |
| 7,046,189 B2 * | 5/2006 | Spanke et al. ................ | 342/124 |
| 7,073,379 B2 * | 7/2006 | Schroth et al. .............. | 73/290 V |
| 7,446,695 B2 * | 11/2008 | McEwan ........................ | 342/21 |
| 7,551,122 B1 * | 6/2009 | Delin et al. ................... | 342/124 |
| 7,819,002 B2 * | 10/2010 | Spanke et al. .............. | 73/290 V |
| 2005/0044952 A1 * | 3/2005 | Schroth et al. .............. | 73/290 V |

(Continued)

FOREIGN PATENT DOCUMENTS

DE 10260962 7/2004

(Continued)

*Primary Examiner* — Thomas Tarcza
*Assistant Examiner* — Peter Bythrow
(74) *Attorney, Agent, or Firm* — Bacon & Thomas, PLLC

(57) ABSTRACT

A method for ascertaining and monitoring fill level of a medium in a container by means of a field device by a travel time measuring method, wherein transmission signals are transmitted in the direction of the medium and reflection signals are received, wherein received reflection signals are registered as echo signals in an echo function dependent on travel time or travel distance, wherein position and/or amplitude at least of a wanted echo signal in the echo function are/is ascertained by means of an echo search algorithm and a continuous echo tracking of changes of position and/or of changes of amplitude of the wanted echo signal in the echo function is performed in a defined search window, wherein position and/or amplitude at least of a wanted echo signal is maintained, in case no wanted echo signal is ascertained in the search window, wherein from position and/or amplitude at least of a wanted echo signal, fill level is ascertained, and wherein a measured value of fill level is output. For this, an asymmetric search window is used for ascertaining the wanted echo signal.

9 Claims, 3 Drawing Sheets

U.S. PATENT DOCUMENTS

| | | | |
|---|---|---|---|
| 2005/0052314 A1* | 3/2005 | Spanke et al. | 342/124 |
| 2006/0052954 A1 | 3/2006 | Welle et al. | |
| 2006/0169040 A1* | 8/2006 | Spanke | 73/290 V |
| 2007/0214880 A1* | 9/2007 | Spanke et al. | 73/290 V |
| 2008/0034863 A1 | 2/2008 | Bartoli et al. | |
| 2008/0302439 A1* | 12/2008 | Spanke et al. | 141/1 |
| 2009/0158839 A1* | 6/2009 | Spanke et al. | 73/290 V |
| 2009/0302867 A1* | 12/2009 | Schroth et al. | 324/642 |
| 2010/0162811 A1* | 7/2010 | Malinovskiy et al. | 73/290 V |
| 2010/0182190 A1* | 7/2010 | Spanke et al. | 342/124 |

FOREIGN PATENT DOCUMENTS

| | | |
|---|---|---|
| DE | 10325267 | 12/2004 |
| DE | 10360710 | 10/2005 |
| DE | 102004052110 | 5/2006 |

* cited by examiner

METHOD FOR ASCERTAINING AND MONITORING FILL LEVEL OF A MEDIUM IN A CONTAINER BY A TRAVEL TIME MEASURING METHOD

TECHNICAL FIELD

The present invention relates to a method for ascertaining and monitoring fill level of a medium in a container by a travel time measuring method.

BACKGROUND DISCUSSION

Such methods for ascertaining and monitoring fill level in a container are frequently applied in the measuring devices of automation, and process control, technology. Available from Endress+Hauser are, for example, fill level measuring devices under the marks, PROSONIC, LEVELFLEX and MICROPILOT which work according to the travel time, measuring method and serve to determine and/or to monitor a fill level of a medium in a container. These fill level measuring devices transmit a periodic transmission signal in the microwave, or ultrasonic, range by means of a transmitting/receiving element in the direction of the surface of a fill substance and receive the reflected echo signals back after a distance dependent, travel time. Usually, fill level measuring devices working with microwaves can be divided basically into two classes; a first class, in the case of which microwaves sent by means of an antenna in the direction of the fill substance are reflected at the surface of the fill substance and then received back after a distance dependent, travel time, and a second class, in the case of which microwaves are guided along a waveguide in the direction of the fill substance, are reflected at the surface of the fill substance due to the impedance jump existing there and the reflected waves are then led back along the waveguide.

From the received echo signals, as a rule, an echo function representing the echo amplitudes as a function of travel time is formed, wherein each value of this echo function corresponds to the amplitude of an echo reflected at an ascertained distance from the transmission element.

In this ascertained echo function, a wanted echo is ascertained, which corresponds to the reflection of the transmission signal on the surface of the fill substance. From the travel time of the wanted echo, there results, in the case of a known propagation velocity of the transmission signals, directly the distance between the surface of the fill substance and the transmission element.

In order to simplify the echo curve evaluation, not the received, raw signal of the pulse sequence is used, but, instead, the envelope, the so called envelope curve, is ascertained. The envelope curve is won, for example, by rectifying the raw signal of the pulse sequence and then filtering with a lowpass filter.

There are a number of methods for determining the wanted echo in an envelope curve. These can be divided into two basic classes: The static ascertainment methods with static echo search algorithms; and/or the dynamic ascertainment methods with dynamic echo search algorithms, for example, by applying historical information.

In a first method of the static echo search, a static echo search algorithm is used to select, as the wanted echo, that echo having a larger amplitude than the remaining one or more echoes. Thus, that echo in the envelope curve with the largest amplitude is taken as the wanted echo.

In a second method of the static echo search, a static echo search algorithm assumes that the wanted echo is the echo in the envelope curve first occurring after the transmission pulse. Thus, the first echo in the envelope curve is selected as the wanted echo.

It is possible to combine the two methods with one another in one static echo search algorithm, e.g. by defining a so-called first echo factor. The first echo factor is a predetermined factor, by which an echo must exceed a certain amplitude, in order to be recognized as the wanted echo. Alternatively, a travel time dependent, echo threshold can be defined, which an echo must exceed, in order to be recognized as the wanted echo.

In a third method, the fill-level measuring device is told once the current fill level. The fill-level measuring device can, on the basis of the predetermined fill level, identify the associated echo as a wanted echo and follow it e.g. by a suitable dynamic, echo search algorithm. Methods of this type are referred to as echo tracking. In such a case, e.g. in each measuring cycle, maxima of the echo signal or of the echo function are ascertained and on the basis of knowledge of the fill level ascertained in the preceding measuring cycle and an application-specific maximum expected rate of change of fill level, the wanted echo is ascertained. From a travel time of the so ascertained, current wanted echo, there results, then, the new fill level.

A fourth method is described in German Patent, DE 102 60 962 A1. There, the wanted echo is ascertained on the basis of data earlier stored in a memory. In such a case, from received echo signals, echo functions are derived, which reflect the amplitudes of the echo signals as a function of their travel times. The echo functions are stored in a table, wherein each column serves for accommodating one echo function. The echo functions are stored in the columns in a sequence corresponding to fill levels associated with the respective echo functions. In operation, the wanted echo and the associated fill level are ascertained on the basis of the echo function of the current transmission signal with the assistance of the table.

In German Patent, DE 103 60 710 $A_1$, a fifth method is described, wherein, periodically, transmission signals are sent in the direction of the fill substance, their echo signals are recorded and converted into an echo function, at least one echo characteristic of the echo function is ascertained, and, on the basis of the echo characteristics of at least one preceding measurement, a prediction is derived for the echo characteristics to be expected in the case of the current measurement. The echo characteristics of the current measurement are ascertained taking the prediction into consideration, and, on the basis of the echo characteristics, the current fill level is ascertained. This method is close to an echo tracking in the broadest sense.

In German Patent, DE 10 2004 052 110 A1, a sixth method is described, which achieves improvement of the wanted echo detection by an echo evaluation and classification of the echoes in the envelope curve.

These above described methods work, per se, without problem in a number of applications. Problems occur, however, always when the echo stemming from the fill level cannot be identified on the basis of the method without there being some doubt as to the correctness of the identification and the wanted echo signal jumps due to process conditions.

In the case of the first method, for example, measurement problems occur, when installed objects are present in the container, which reflect the transmission signals better than the surface of the fill substance.

In the case of echo tracking according to the third method, measurement problems occur, when, during operation, the wanted echo runs over a disturbance echo and, subsequently, the disturbance echo is tracked as a wrong wanted echo. Furthermore, there is a problem, when, during turn-on, the preceding wanted echo signal no longer agrees with the current one or the preceding wanted echo signal is not known.

If, mistakenly, an echo other than the fill-level echo is classified as wanted echo, there is the danger, that a wrong fill level is output, without that this is noticed. This can, depending on application, lead to an overfilling of containers, to operation of pumps empty or to other happenings connected, in part, with considerable danger.

Due to the above described measurement problems, wrong, or unsettled, measured value ascertainment of fill level of the medium in the container can occur. In the worst case, a so-called echo loss can be experienced, wherein the wanted echo signal can no longer be identified, or found.

SUMMARY OF THE INVENTION

An object of the invention is to provide a more stable, safe and improved method for ascertaining wanted echo signals in echo curves of the travel-time measurement of measurement signals.

This object of the invention is achieved by a method by which transmission signals are transmitted in the direction of the medium and reflected signals from the medium are received. The reflected signals are registered as echo signals, by means of which position and/or amplitude are ascertained by an echo search algorithm of at least a wanted echo signal. Tracking of changes of position and/or of amplitude of the wanted echo signal are performed in a defined search window. The position and/or amplitude of the wanted echo signal is maintained and the fill level is ascertained as an outputted measured value.

BRIEF DESCRIPTION OF THE DRAWINGS

Other details, features and advantages of the subject matter of the invention will become evident from the following description with associated drawings, in which preferred examples of embodiments of the invention are presented. Examples of embodiments of the invention shown in the figures are, to avoid clutter and for the simplification of elements, which correspond in their construction and/or function, provided with equal reference characters. The figures of the drawing show as follows.

DETAILED DISCUSSION IN CONJUNCTION WITH THE DRAWINGS

Figure 1:
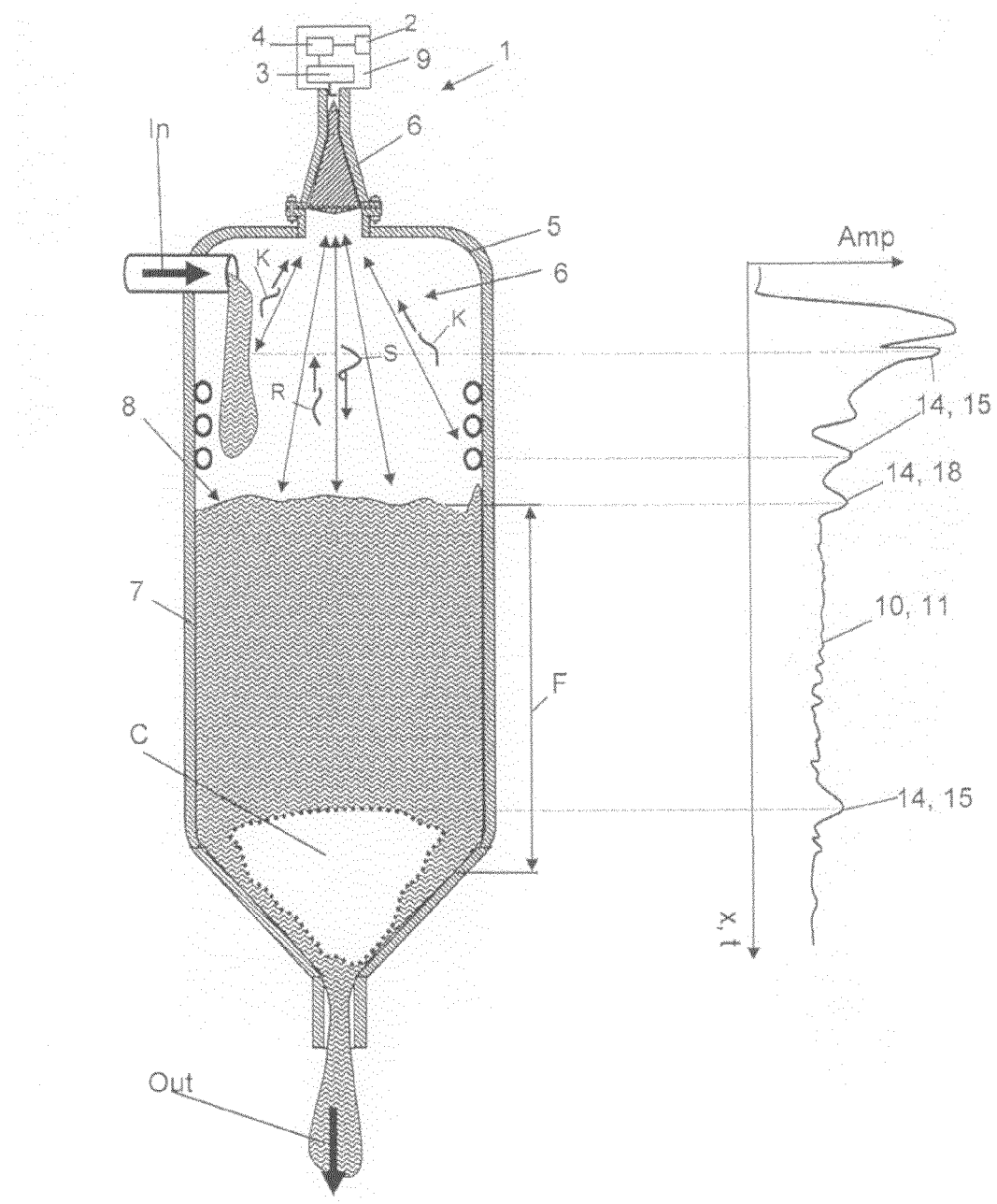
FIG. 1 is an example of an embodiment of a measuring device for ascertaining fill level, along with a corresponding echo function.

FIG. 1 shows a measuring device 1, working according to the travel time, measuring method and mounted on a container 5 at a nozzle, for ascertaining fill level F of a medium 7. The illustrated measuring device 1 includes: a transmitting/receiving element 6 radiating freely into the process space; and a measurement transmitter 9. The measurement transmitter 9 includes: At least one transmitting/receiving unit 3, which serves for producing and receiving the measuring signals; a control/evaluation unit 4, which serves for signal processing of the measuring signals and for controlling the measuring device 1; and, additionally, a communication unit 2, which controls the communication via a bus system, as well as the energy supply of the measuring device 1. Integrated in the control/evaluation unit 4 is, for example, a memory element, in which the measurement parameters and echo parameters are stored and in which measuring factors and echo factors are stored. The transmitting/receiving element 6 is provided in this example of an embodiment, for example, as a horn antenna; however, any known antenna, such as e.g. a rod antenna or a planar antenna, can be provided as transmitting/receiving element 6. In the transmitting/receiving unit 3, a measurement signal, for example, in the form of a high-frequency transmission signal S, is produced and radiated via the transmitting/receiving element 6 with a predetermined radiation characteristic in the direction of medium 7. Following a travel time t dependent on the traveled distance x, the transmission signals S reflected on the surface S of the medium 7 are received back by the transmitting/receiving element 6 and the transmitting/receiving unit 3 as reflection signal R. The control/evaluation unit 2 connected thereafter ascertains from the reflection signals R an echo function 10, which shows the amplitudes of the echo signals 14 of this reflection signal R as a function of the traveled distance x or the corresponding travel time t. Through an analog/digital conversion of the analog echo function 10, or the echo curve 10, a digitized envelope curve 11 is produced. In the following, only the term 'echo function 10' will still be used, wherein this term likewise implies the terms, 'echo curve 10', 'envelope function', or 'envelope curve 11'.

An echo function 10 depicting the measuring situation in the container 5 is presented proportionally to the traveled distance x of the transmission signal S. For better understanding, reference lines are associated with the corresponding echo signals 1S in the echo function 10, so that cause and effect can be appreciated at a glance.

Displayed in the beginning region of the echo function 10 is the decay behavior, or the so-called ringing, which can arise due to multiple reflections or also due to accretion formation in the transmitting/receiving element 6 or in the nozzle. In the beginning region of the echo function, an echo signal 14 is shown, which is caused by the disturbance echo K of the inflow In, or the filling stream, of the medium 7. There are, in solid material applications, also disturbing echoes K, which are caused by the formation of hollow spaces (cavities) C. These hollow spaces C can, through the steady outflow Out of the medium 7, suddenly collapse, whereby fill level F of the medium 7 in the container abruptly sinks. The method of the invention is not only for application alone in freely radiating microwaves measuring devices 1, such as presented explicitly in FIG. 1, but, instead, the method of the invention can also be used in other travel time, measurement systems, such as, for example, TDR measuring devices or ultrasound measuring devices.

Figure 2:
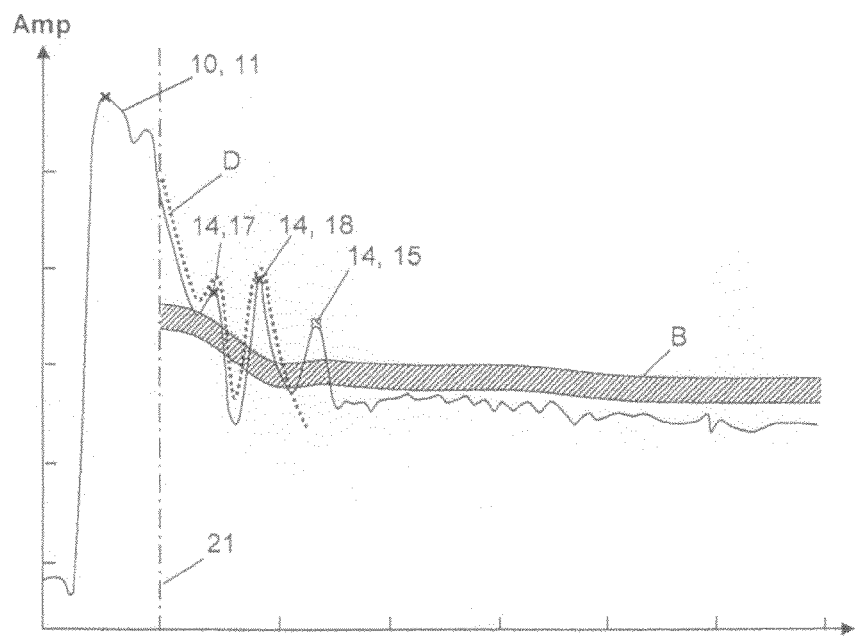
FIG. 2 is an echo function with evaluation function ascertained by a static echo search algorithm.

According to today's state of the art, there are different approaches for determining the exact position $x_1$ of the wanted echo signal 15 in the ascertained echo function 10 or in the digital envelope curve. The accuracy of measurement, which can be achieved with this echo measuring principle under given measuring conditions, depends on the exact determining of the measured position of the fill level F in the echo function 10, A static approach for determining fill level is illustrated in the echo function 10 in FIG. 2. FIG. 2 shows the echo function 10 of FIG. 1 enlarged and rotated into the horizontal. On the abscissa is measured the required travel time t or traveled distance x of the measurement signal in the container 5, and the ordinate provides the amplitude values Amp of the echo function 10.

Presented in the diagram is an evaluation curve B, which is ascertained by means of a static echo search algorithm, e.g. a mathematical filter function in the form of a sliding average formation, from the particular echo function 10, or from an echo function 10 ascertained at start-up in an empty container 5. This evaluation curve B is used for ascertaining the wanted echo signals 15 in the echo function 10 and begins from a zero line 20, which is, most often, the start position of the measuring range of a measuring device 1. Accordingly, this evaluation curve B is used as a reference curve, or stop criterion, for the static echo search algorithm 12 for finding wanted echo signals 15 in the echo function 10. As a result, an option is to identify the wanted echo signals 15 in the echo function 10 by means of the evaluation curve B. The signal components, which lie above the evaluation curve B, are recognized by the static echo search algorithm 12 as wanted echo signals 15.

Moreover, a masking curve D is shown, on the basis of which disturbance signals K and noise signals, which can arise, for example, from disturbance reflections on installed objects in the container, from multipath propagation and from multimode propagation, from foam and accretion formation of the medium and from turbulent, medium surfaces, are masked out.

For setting the measuring conditions and the evaluation condition by means of the static and dynamic echo search algorithms 12, 13, depending on measuring device 1 and application, quite a few different parameters are required. Among the parameters are also data concerning the geometry of the utilized container 5, an empty distance, in the case of which the fill-level measuring device 1 should detect, that a container for the medium 7 is empty, and a fill level upper limit, in the case of which the fill-level measuring device 1 should detect, that the container 5 is full. In addition to these, there is, as a rule, an application dependent, measuring device specific, block distance, within which no fill level measurement is possible, a background signal, which is to be masked out in the measuring, as well as material properties of the medium 7, such as e.g. its dielectric constant.

Also selection rules for determining the wanted echo signal 15 play an important role. These static selection rules are frequently referred to in the industry as first echo factor. Such static selection rules can, depending on application, specify, that that echo with the shortest travel time is to be selected as wanted echo, that that echo with the largest amplitude is to be selected as wanted echo, or that the wanted echo is to be selected on the basis of a weighting function, which takes into consideration the travel times and the amplitudes of the echo signals.

Figure 3:
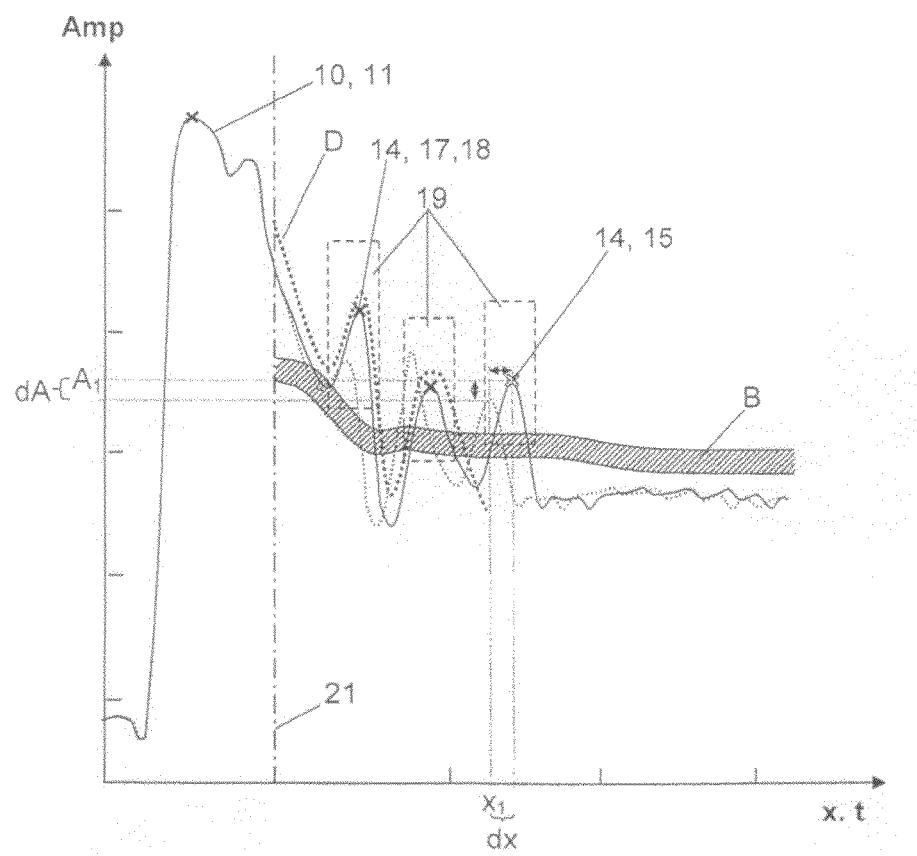
FIG. 3 is an echo function with echo tracking ascertained by a dynamic echo search algorithm.

In order to adapt these static selection rules to, per se, changing measuring conditions, FIG. 3 shows, in a slightly enlarged drawing, the echo function of FIG. 2 with a combination of the invention of the static echo search algorithm 12 and the dynamic echo search algorithm 13. Due to changing measuring conditions or changes in the measuring device 1, the ascertained echo function 10 changes. The current echo function 10 is depicted by a continuous line and the old echo function 10 as a dotted line. Through direct comparison, the positional changes dx of the position $x_1$ and amplitude changes dA of the amplitude $A_1$ can be determined in the echo signals 14 and in the wanted echo signal 15. According to the invention, by means of a dynamic echo tracking algorithm 13, an echo tracking of the echo signals and the wanted echo signal 15 is performed. For this, before a first measuring cycle, the position $x_1$ of the wanted echo signal 15 is ascertained by means of a static echo search algorithm 12 or the position $x_1$ of the wanted echo signal 15 is selected by the operator of the measuring device from the illustrated echo function 10, or envelope curve 11, or input as a corresponding parameter. At this position $x_1$, a search window 19 is placed by the dynamic echo search algorithm 13. This search window 19 has a predetermined width and height and is so arranged, that, starting from the position $x_1$, after a positional change dx, the echo signal 14 or the wanted echo signal 15 can be sought in the two oppositely moving directions. Used as position $x_1$ is the peak or a defined point in the region of the echo signal 14 or the wanted echo signal 15. The width and height of the search window can also, for example, be matched to the height and pulse width of the echo signal 14 and the wanted echo signal 15.

From the positional change dx and the amplitude change dA, conclusions can be made concerning changes in the masking curve D, the evaluation curve B and the echo parameters E. The evaluation curve B and the masking curve D are newly calculated or adjusted on the basis of the new positional data of the echo signals 14 and the wanted echo signals 15. Through this method of the invention, the static echo search algorithm 12 is adapted, on the basis of changes in the ascertainment parameters, such as e.g. the masking curve D, the evaluation curve B and the echo parameters E, to the changing measuring conditions. The change history of the masking curve D, the evaluation curve B and the echo parameters E can be stored, for example, in a so-called drag pointers, which retain minimum and maximum states, and these can be correspondingly presented on the display.

Figure 4:
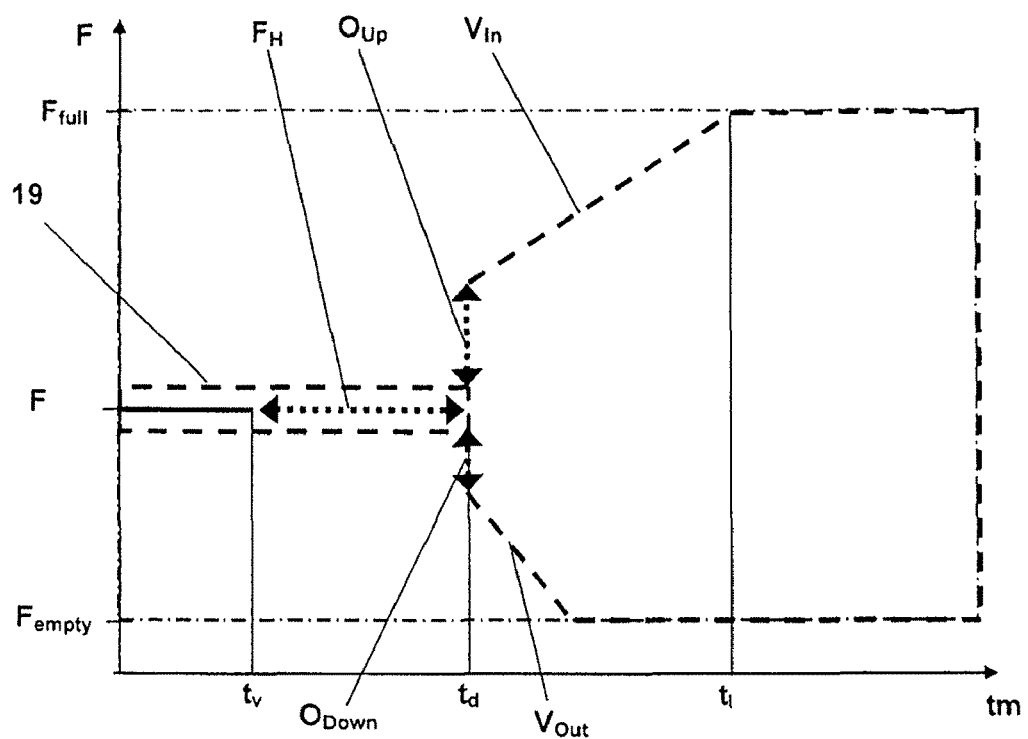
FIG. 4 is a search window function of the invention, with jump delay in the ascertaining of fill level.

FIG. 4 illustrates the jump delay of the invention for the measured value ascertainment of fill level F of the medium 7 in the case of disappearance of the wanted echo signal 15 due to disturbance echo signals K and jumps of the fill level F. For example, due to the inflow In of the medium 7 into the container 5, a disturbance echo K can be ascertained, which, in turn, is recognized incorrectly as wanted echo signal 15. In this way, the ascertained, value of fill level F would jump from the actual wanted echo signal 15 of the surface S the medium 7 to the disturbance echo signal K of the filling stream In. The measured value of fill level F would, in this case, jump back and forth between the distance value for the surface S of the medium 7 and the distance value for the filling stream In of the medium 7, depending on whether the container 5 is being filled or not. Furthermore, a possibility is that, due to the forming of hollow spaces C in solid media 7 or in the case of stone comminution applications, there is a sudden falling of the surface S of the medium 7.

FIG. 4 shows the search window 19 with the measured value fill level F as a function of the measurement duration tm. On the ordinate is measured fill level F from empty $F_{empty}$ to full $F_{full}$ and on the abscissa the measurement duration tm of the search for the wanted echo signal 15. The method of jump delay, or echo loss delay, of the invention produces more stable measured values of fill level F, without influencing the measurement certainty of the field device 1. The method detects a jump of the wanted echo signal 15, in that the wanted echo signal 15 can no longer be detected in the predetermined region, or in the predetermined search window 19. If the wanted echo signal 15 is missing in this search window 19, at the point in time $t_v$ of the echo disappearance, a counter is started, which counts down a predetermined time, of, for example, ten seconds up to a day, depending on the application area of the fill-level measuring device. In this counted time, or delay time, $t_d$, the last measured value fill level F is maintained. If the wanted echo signal 15, within delay time $t_d$, is found back in the search window 19, the counter is stopped and reset. Furthermore, it is possible that, first, the position $x_1$ of the disappeared, wanted echo signal 15 is back calculated from the historical values in a tank table, in which the historical values of preceding measurements are stored, as well as from the probe end signal or the tank floor signal. In this case of the calculated position $x_1$ of the wanted echo signal 15, the search window 19, in the case of added loss of probe end signal or container floor signal, is set to this position $x_1$ and the above described method of jump delay, or echo loss delay, of the invention by means of a counter is started. Also back calculated positions must then lie in this window, in order that they be accepted as fill level value. The delay time $t_d$ is input into the field device 1 by the operator, for example, based on experience, or as ascertained from experiential values of older procedures of the wanted echo signal search. If this delay time $t_d$ is, however, passed, the limits of the search window are enlarged by a lower limit shift $O_{Down}$ and/or an upper limit shift $O_{Up}$. The lower limit shift $O_{Down}$ and/or upper limit shift $O_{Up}$ need not be equal in magnitude, so that also an asymmetric increasing of the search window 19 is possible. Following this jump-like increasing of the search window 19, the limits are steadily enlarged with at least one predetermined slope. This slope can be related to an inflow velocity $V_{In}$ and/or to the outflow velocity $V_{Down}$ of the medium 7 in the container 5 or correspondingly specified by the operator. On the basis of experiential values of the operator with the process installation or on the basis of the difference between the inflow velocity $V_{In}$ of the inflow In and the outflow velocity $V_{Down}$ of the outflow Out, the slope of the change of the lower limit shift $O_{Down}$ relative to the upper limit shift $O_{Up}$ can be asymmetric.

Following a predetermined time or when the maximal limits of the search window 19, for example, have enlarged to the minimal fill level $F_{empty}$ and/or maximal fill level $F_{full}$, then the field device (1) is, after this echo loss time ($t_1$), which is greater than the delay time ($t_d$), shifted into the alarm state. In the alarm state, for example, a warning report "echo loss" is output on the display of the field device 1 and/or via a fieldbus, or a two-wire line, a corresponding alarm message is dispatched to the control station. In the normal case, the measured value fill level F and the status of the measurement certainty is output on the display of the field device 1 and/or dispatched via a fieldbus, or a two-wire line, to the control station. The status of the measurement certainty tells how exactly the measured value was ascertained, in that given, for example, is after what time span the wanted echo was again found or how greatly the search window had to be enlarged, until the wanted echo could be found again.

The invention claimed is:

1. A method for ascertaining and monitoring fill level of a medium in a container by means of a field device by a travel time measuring method, comprising the steps of:
    transmitting transmission signals in the direction of the medium and receiving reflection signals said, received reflection signals are registered as echo signals in an echo function dependent on travel time or travel distance;
    ascertaining, by means of an echo search algorithm, position and/or amplitude at least of a wanted echo signal in the echo function;
    performing continuous echo tracking of changes of position and/or of changes of amplitude of the wanted echo signal in the echo function in a defined search window;
    maintaining said position and/or amplitude of said at least said wanted echo signal, in case no wanted echo signal is ascertained in said search window;
    ascertaining fill level from said position and/or amplitude of said at least said wanted echo signal; and
    outputting a measured value of the fill level, wherein:
    said position and/or said amplitude of said at least said wanted echo signal is maintained at least for a predetermined delay time,
    after expiration of a predetermined delay time, the width of said search window is set with at least one predetermined slope, and
    said slope is asymmetrically set from an inflow velocity and/or from an outflow velocity.

2. The method as claimed in claim 1, wherein:
    said position and/or said amplitude of said at least said wanted echo signal are/is back calculated from historical values in a table, in which the historical values of preceding measurements are stored, and/or from the probe end signal or the container floor signal, and said search window is placed at the calculated said position of said wanted echo signal which has disappeared.

3. The method as claimed in claim 1, wherein:
    after expiration of a predetermined delay time, the width of said search window is jump-like enlarged on the basis of a predetermined, lower limit shift and a predetermined, upper limit shift.

4. The method as claimed in claim 3, wherein:
    the width of said search window is asymmetrically enlarged on the basis of said predetermined, lower limit shift and said predetermined, upper limit shift.

5. The method as claimed in claim 1, wherein:
    said slope is enlarged from an inflow velocity down to minimum fill level and/or from an outflow velocity up to the maximal fill level.

6. The method as claimed in claim 1, wherein:
    said slope is determined from an inflow velocity, and/or from an outflow velocity, of the medium in the container.

7. The method as claimed in claim 3, wherein:
    said lower limit shift, said upper limit shift, said inflow velocity and/or said outflow velocity, of the medium in the container are/is predetermined as parameters by the operator.

8. The method as claimed in claim 1, wherein:
    supplementally to the ascertained fill level of the wanted echo signal, also status of measurement certainty due to the enlarged search window is output.

9. The method as claimed in claim 1, wherein:
    after expiration of a predetermined echo loss time, which is greater than the delay time, the field device is shifted into an alarm state.

* * * * *